J. F. McMILLIAN AND C. E. REED.
FISHING TOOL.
APPLICATION FILED JULY 14, 1919.
1,362,883.
Patented Dec. 21, 1920.
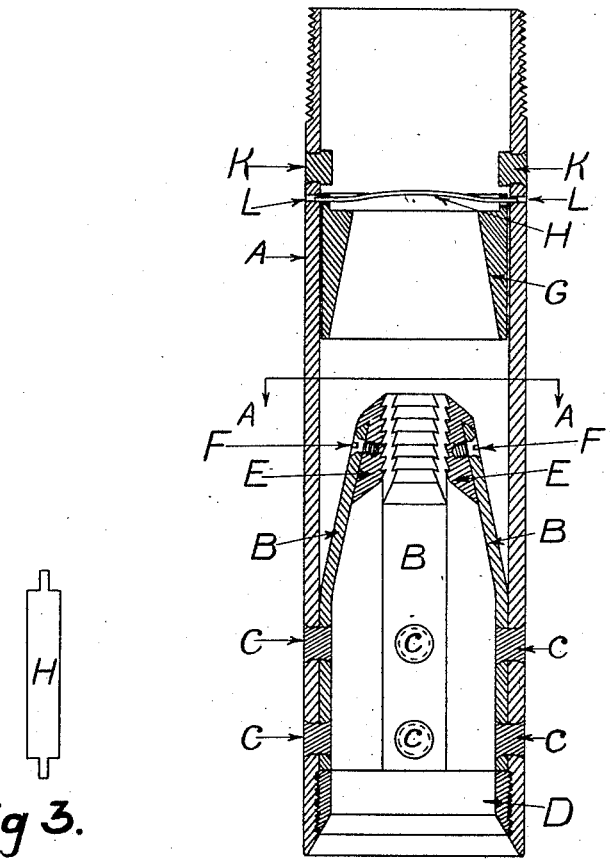
Fig 1.
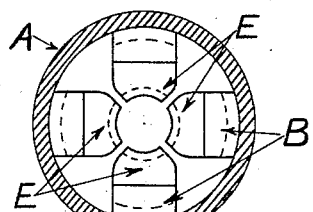
Fig 3.
Fig 2.
INVENTOR.
J. F. Mc Millian.
C. E. Reed.
BY
Hardway & Cathey.
ATTORNEY.

UNITED STATES PATENT OFFICE.

JOHN F. McMILLIAN, OF HUMBLE, AND CLARENCE E. REED, OF HOUSTON, TEXAS.

FISHING-TOOL.

1,362,883.   Specification of Letters Patent.   Patented Dec. 21, 1920.

Application filed July 14, 1919. Serial No. 310,546.

*To all whom it may concern:*

Be it known that we, JOHN F. MCMILLIAN and CLARENCE E. REED, citizens of the United States, residing at Humble and Houston, respectively, in the county of Harris and State of Texas, have invented certain new and useful Improvements in Fishing-Tools, of which the following is a specification.

This invention relates to new and useful improvements in a fishing tool.

One object of the invention is to provide a tool of the character described which is adapted to be let down into a well bore for the purpose of engaging with rods or tubing, which may have become stuck in the bore, and through the instrumentality of which, said rods or tubing may be withdrawn. In drilling and pumping wells, particularly oil wells, the tubing or pump rods may become twisted off or broken down below the surface of the ground, and in such case, in order to withdraw them, it is necessary to let down a fishing tool into the bore formed so as to engage with said rods or tubing whereby the same may be withdrawn from the bore. This tool has been designed for that purpose.

Another object of the invention is to provide a fishing tool of the character described which is equipped with means for automatically locking the same in engagement with the tubing or rod to be withdrawn from the bore.

A further feature of the invention resides in the provision of a fishing tool which is light, and of simple construction, and which can be manufactured cheaply and easily kept in repair.

With the above and other objects in view, the invention has particular relation to certain novel features of construction, operation and arrangement of parts, an example of which is given in this specification and illustrated in the accompanying drawings, wherein:

Figure 1, is a vertical sectional view.

Fig. 2, is a transverse sectional view taken on the line A—A of Fig. 1, and

Fig. 3, is a plan view of a retaining spring employed.

Referring now more particularly to the drawings, wherein like characters of reference designate similar parts in each of the figures, A refers to a tubular body having the flexible members, B, secured within the same near its lower end by means of the rivets C, C. As shown, there are four of these members B, spaced a uniform distance apart around the body A, and their upper ends are free and converge inwardly toward each other, as illustrated in Figs. 1 and 2. Threaded within the lower ends of the tubular body A, there is the thrust ring D, which abuts against the lower ends of the members B, and the lower end of the thrust ring and body are flared outwardly, as shown in Fig. 1, so as to readily slip over the upper end of the rod or tubing to be withdrawn. Fastened to the upper ends of the members B, are the grip jaws E. These jaws may be secured to the upper ends of the members B, in any approved manner. As shown, the upper ends of the said members B are dovetailed into the jaws and said jaws are further secured to them by means of the set screws F, and the inner faces of the jaws are toothed, so as to more readily engage with the object to be pulled. An annular wedge G is carried by the tool above the jaws and is suspended in position by means of a flat spring H, whose ends are reduced and project through alined holes L, in the upper end of the wedge and in the body A, and above said wedge, there are the inwardly projecting stops K, carried by the body A. The upper end of the fishing tool is outwardly threaded for attachment to a string of tubing by means of which the device is let down into the bore. As the tool descends, it will pass over the upper end of the rod or tubing to be pulled, the members B yielding outwardly, and as the device is further lowered, the spring H will come into contact with the upper end of said tubing or rod and its reduced ends will thereby be withdrawn from the holes L, thus releasing the wedge G. During this operation, said wedge will be prevented from being carried upwardly in the body A, by the stops K. When the spring H has been released, the wedge G will drop down around the flexible members B and the jaws E thus locking said jaws against the rod or tubing to be withdrawn. An upward pull is then exerted on the tubing, to which the fishing tool is attached, and the rod or tubing engaged by said tool will thereby be withdrawn from the bore.

What we claim is:

A fishing tool including a tubular body adapted to fit over a rod, resiliently mounted jaws therein adapted to engage with said rod, an annular wedge mounted in said body above the jaws, locking means securing said wedge in position and adapted to be released by said rod to permit the wedge to drop by gravity into position around the jaws whereby they are locked into engagement with said rod.

In testimony whereof we have signed our names to this specification in the presence of two subscribing witnesses.

JOHN F. McMILLIAN.
CLARENCE E. REED.

Witnesses:
E. A. EVANS,
H. S. ROGERS.